US011215131B2

(12) United States Patent
Höglund et al.

(10) Patent No.: US 11,215,131 B2
(45) Date of Patent: Jan. 4, 2022

(54) INTERNAL COMBUSTION ENGINE AND METHOD FOR CONTROLLING SUCH AN INTERNAL COMBUSTION ENGINE

(71) Applicant: FREEVALVE AB, Ängelholm (SE)

(72) Inventors: Anders Höglund, Munka Ljungby (SE); Urban Carlson, Helsingborg (SE)

(73) Assignee: FREEVALVE AB, Angelholm (SE)

( * ) Notice: Subject to any disclaimer, the term of this patent is extended or adjusted under 35 U.S.C. 154(b) by 205 days.

(21) Appl. No.: 16/494,626

(22) PCT Filed: Mar. 16, 2018

(86) PCT No.: PCT/SE2018/050257
§ 371 (c)(1),
(2) Date: Sep. 16, 2019

(87) PCT Pub. No.: WO2018/169480
PCT Pub. Date: Sep. 20, 2018

(65) Prior Publication Data
US 2020/0132003 A1    Apr. 30, 2020

(30) Foreign Application Priority Data
Mar. 16, 2017 (SE) .................... 1750314-5

(51) Int. Cl.
*F02D 41/00* (2006.01)
*F02M 26/04* (2016.01)
(Continued)

(52) U.S. Cl.
CPC ............ *F02D 41/005* (2013.01); *F02B 37/02* (2013.01); *F02D 13/0203* (2013.01);
(Continued)

(58) Field of Classification Search
CPC ........ F02M 26/04; F02M 26/08; F02M 26/43; F02M 26/07; F02M 26/14; F02M 26/17;
(Continued)

(56) References Cited

U.S. PATENT DOCUMENTS

2012/0000448 A1    1/2012  Freund et al.
2012/0260897 A1   10/2012  Hayman et al.
(Continued)

FOREIGN PATENT DOCUMENTS

DE    10 2012 205851 A1   10/2012
DE    10 2015 111731 A     2/2016
(Continued)

OTHER PUBLICATIONS

European Search Report, 18 767 737.2, dated Oct. 8, 2020.
(Continued)

*Primary Examiner* — Ngoc T Nguyen
(74) *Attorney, Agent, or Firm* — Nixon & Vanderhye

(57) ABSTRACT

An internal combustion engine includes combustion chambers, each having a first intake port, and first and second exhaust ports. An intake manifold is connected to the first intake port of each combustion chamber, a main pressure booster upstream of the intake manifold. An exhaust discharge arrangement includes a main exhaust manifold connected to the first exhaust port of each combustion chamber, the exhaust discharge arrangement connected to the second exhaust port of a first subset combustion chambers, and an exhaust recirculation manifold connected to the second exhaust port of a second subset combustion chambers and connected to an upstream side of the main pressure booster. The engine operates in high load and low load modes, which vary how the engine evacuates the exhaust gas of the second subset combustion chambers to the exhaust recirculation manifold. A related method is also disclosed.

20 Claims, 2 Drawing Sheets

(51) Int. Cl.
  *F02M 26/08* (2016.01)
  *F02M 26/14* (2016.01)
  *F02M 26/17* (2016.01)
  *F02M 26/43* (2016.01)
  *F02B 37/02* (2006.01)
  *F02D 13/02* (2006.01)
  *F02M 35/10* (2006.01)
  *F02B 37/00* (2006.01)
  *F02B 37/013* (2006.01)

(52) U.S. Cl.
  CPC ......... *F02D 41/0007* (2013.01); *F02M 26/04* (2016.02); *F02M 26/08* (2016.02); *F02M 26/14* (2016.02); *F02M 26/17* (2016.02); *F02M 26/43* (2016.02); *F02M 35/10222* (2013.01); *F02B 37/001* (2013.01); *F02B 37/013* (2013.01); *F02D 2200/101* (2013.01); *F02D 2200/1002* (2013.01)

(58) Field of Classification Search
  CPC ............. F02D 13/0257; F02D 41/1475; F02D 41/008; F02D 41/0082; F02B 37/04; F02B 37/013
  See application file for complete search history.

(56) References Cited

U.S. PATENT DOCUMENTS

| | | |
|---|---|---|
| 2014/0142833 A1 | 5/2014 | Gingrich |
| 2014/0190458 A1 | 7/2014 | Gingrich et al. |
| 2014/0238363 A1 | 8/2014 | Keating et al. |
| 2015/0184558 A1 | 7/2015 | Hoglund |
| 2015/0316005 A1* | 11/2015 | Madison ............. F01L 13/0042 60/602 |
| 2016/0040607 A1 | 2/2016 | Ku et al. |
| 2016/0215736 A1 | 7/2016 | Millward |
| 2016/0237928 A1 | 8/2016 | Lana et al. |
| 2018/0171908 A1* | 6/2018 | Ulrey ...................... F02D 41/26 |

FOREIGN PATENT DOCUMENTS

| | | |
|---|---|---|
| SE | 537203 | 9/2014 |
| SE | 1350849 | 1/2015 |

OTHER PUBLICATIONS

International Search Report, PCT/SE2018/050257, dated May 22, 2018.
Written Opinion, PCT/SE2018/050257, dated May 22, 2018.

* cited by examiner

INTERNAL COMBUSTION ENGINE AND METHOD FOR CONTROLLING SUCH AN INTERNAL COMBUSTION ENGINE

TECHNICAL FIELD OF THE INVENTION

The present invention relates generally to the field of internal combustion engines suitable for powering a vehicle, such as a car or a truck, a boat, etc., or a machine such as an electric power generator or the like. Further, the present invention relates specifically to an internal combustion engine suitable for a performance car, i.e. a car that is designed and constructed specifically for speed.

The inventive internal combustion engine comprises a set of combustion chambers, each combustion chamber being provided with, a first controllable intake valve configured for opening and closing a first intake port, a first controllable exhaust valve configured for opening and closing a first exhaust port, and a second controllable exhaust valve configured for opening and closing a second exhaust port, wherein the internal combustion engine further comprises an intake manifold connected to the first intake port of each combustion chamber of said set of combustion chambers, a main pressure booster arranged upstream said intake manifold for providing gas to the intake manifold, an exhaust discharge arrangement comprising a main exhaust manifold connected to the first exhaust port of each combustion chamber of said set of combustion chambers, the exhaust discharge arrangement being connected to the second exhaust port of each combustion chamber of a first subset combustion chambers, and an exhaust recirculation manifold connected to the second exhaust port of each combustion chamber of a second subset combustion chambers and connected to an upstream side of the main pressure booster in relation to said intake manifold.

The invention also relates to a method of operating such an internal combustion engine.

BACKGROUND OF THE INVENTION

In internal combustion engines a mixture of air and fuel is provided into a combustion chamber, i.e. cylinder. The air-fuel mixture is compressed and ignited, either by a spark plug or spontaneously due to the compression. The heat and energy released by the burning of the air-fuel mixture causes a further rise in pressure in the combustion chamber which is used to do work against a movable wall of the combustion chamber, i.e. the piston, which work is converted into movement by a crank shaft attached to the piston via a piston rod. The exhaust gas formed from the burning of the air-fuel mixture is then evacuated from the combustion chamber and new air and fuel I introduced.

With rising concerns of the environment and pollution caused by the exhaust gas from internal combustion engines there is a need to lower harmful emissions from internal combustion engines while at the same time maintaining or increasing the efficiency of conversion of the chemical energy in the fuel to kinetic energy of the crankshaft.

One known way to reduce emissions is to recirculate a part of the exhaust gas from the internal combustion engine for mixing said recirculated exhaust gas with the fresh air introduced into the internal combustion engine. However, the known proposed implementations of this technique are limited and may not fulfil the performance requirements placed on an internal combustion engine for use in a vehicle. Further, due to high dilution using a buffer gas, i.e. a large amount of exhaust gas recirculation, the ignition of the air-fuel mixture (and exhaust gas comprising hydrogen) may become unstable.

OBJECT OF THE INVENTION

The present invention aims at obviating the aforementioned disadvantages and failings of previously known internal combustion engines comprising a combustion chamber and wherein part of the exhaust gas formed in the combustion chamber is recirculated and mixed with the fresh air provided to the combustion chamber. A primary object of the present invention is to provide an improved internal combustion engine of the initially defined type which is more versatile.

It is another object of the present invention is to provide an improved internal combustion engine generating less emission. It is yet another object of the invention is to provide an improved internal combustion engine having a more stable ignition.

It is another object of the present invention to obtain thorough removal of the exhaust gas form the combustion chambers, since this eliminates the risk that remaining exhaust gas in the combustion chamber heats the new charge of air and fuel delivered into the combustion chamber, and by reducing the heating of the new charge also reducing the risk of knocking.

It is another object of the present invention to use of a buffer gas (exhaust gas) in the gas for combustion since this result in a cooler combustion, increased knock resistance and consequently the possibility of increasing compression ratio, and a better thermal efficiency. Recirculation also results in NOx reduction.

SUMMARY OF THE INVENTION

According to the invention at least the primary object is attained by means of the initially defined internal combustion engine and method having the features defined in the independent claims. Preferred embodiments of the present invention are further defined in the dependent claims.

According to a first aspect of the present invention, there is provided an internal combustion engine of the initially defined type, which is configured to be driven in at least a high load mode (HL) and in a low load mode (LL), respectively, wherein i) during the low load mode (LL), the internal combustion engine is configured to evacuate at least 90% of the exhaust gas of the second subset combustion chambers to the exhaust recirculation manifold and configured to evacuate the exhaust gas of the first subset combustion chambers to the exhaust discharge arrangement, and ii) during the high load mode (HL), the internal combustion engine is configured to evacuate at least 90% of the exhaust gas of the second subset combustion chambers to the exhaust discharge arrangement and configured to evacuate the exhaust gas of the first subset combustion chambers to the exhaust discharge arrangement, wherein the maximum output torque [Nm] of the internal combustion engine is dependent on engine speed [rpm], and according to a preferred embodiment of the present invention, during the high load mode (HL), the internal combustion engine is configured to evacuate at least 1% of the exhaust gas of the second subset combustion chambers to the exhaust recirculation manifold when the output torque is greater than 70% of said maximum output torque.

According to a second aspect of the present invention, there is provided a method for controlling such an internal combustion engine.

Thus the present invention is based on the insight that by having first and second controllable exhausts valves serving each combustion chamber and having the second exhaust port of a second subset combustion chambers connected to the inlet manifold in a simple and efficient way, a large variety in the amount of recirculated exhaust gas, i.e. provided to the air for combustion, is allowed. Thereto, the present invention is based on the insight that different operational modes of the internal combustion engine require different amount of recirculated exhaust gas, and at high performance levels of the internal combustion engine it is essential to secure that the combustion chamber comprises no residual exhaust gases.

The maximum output torque [Nm] of the internal combustion engine is dependent on engine speed [rpm], and according to a preferred embodiment of the present invention the internal combustion engine is configured to shift from low load mode (LL) to high load mode (HL) at a predetermined first torque level (T1) and configured to shift from high load mode (HL) to low load mode (LL) at a predetermined second torque level (T2). Preferably, t the first torque level (T1) is greater than the second torque level (T2), in order to obtain distinct changeover between the high load mode (HL) and low load mode (LL).

According to a preferred embodiment of the present invention, the exhaust discharge arrangement comprises a supplementary exhaust manifold connected to the second exhaust port of each combustion chamber of the first subset combustion chambers. Thereby, the exhaust gases of the first subset combustion chambers may bypass the main pressure booster when the counter pressure of the main pressure booster is elevated.

According to a preferred embodiment of the present invention, the internal combustion engine comprises a supplementary pressure booster connected to an upstream side of the main pressure booster in relation to said intake manifold, wherein the supplementary exhaust manifold is connected to an upstream side of the supplementary pressure booster in relation to the main pressure booster. Thereby, the exhaust gases of the first subset combustion chambers may be directed to the supplementary pressure booster when the counter pressure of the main pressure booster is elevated.

According to a preferred embodiment of the present invention, a supercharger is arranged between the main turbocharger and the intake manifold. Thereby, a higher volumetric efficiency may be obtained.

According to preferred embodiments of the present invention, the main pressure booster and the supplementary pressure booster, respectively, are constituted by a turbocharger.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The present invention relates generally to the field of internal combustion engines suitable for powering a vehicle. The inventive internal combustion engine, generally designated 1, comprises a set of combustion chambers 2. The set/plurality of combustion chambers 2 comprises at least two separate combustion chambers, also known as cylinders. However, the internal combustion engine 1 may comprise more combustion chambers, such as 3, 4, 6, 8, 10, 12 or 16. Each combustion chamber is preferably cylindrical.

The internal combustion engine 1 may be constituted by a two-stroke engine having two strokes, i.e. "compression" and "return" strokes, but is preferably constituted by a four-stroke engine having four strokes, i.e. "intake" during which air/gas and fuel are delivered into the combustion chamber 2, "compression" during which the air-fuel mixture in the combustion chamber 2 is compressed, "expansion/combustion" during which the air-fuel mixture is ignited and combusted, and "exhaust" during which the exhaust gas formed by the combustion of the air-fuel mixture is evacuated, also known as scavenged, from the combustion chamber. Preferably the internal combustion engine 1 is constituted by a spark-ignition engine, i.e. in which the air-fuel mixture is ignited by a spark from a sparkplug, but may also be constituted by a compression-ignition engine. The internal combustion engine 1 is preferably configured to be driven by petrol/gasoline, but may alternatively be configured to be driven by diesel.

Figure 1:
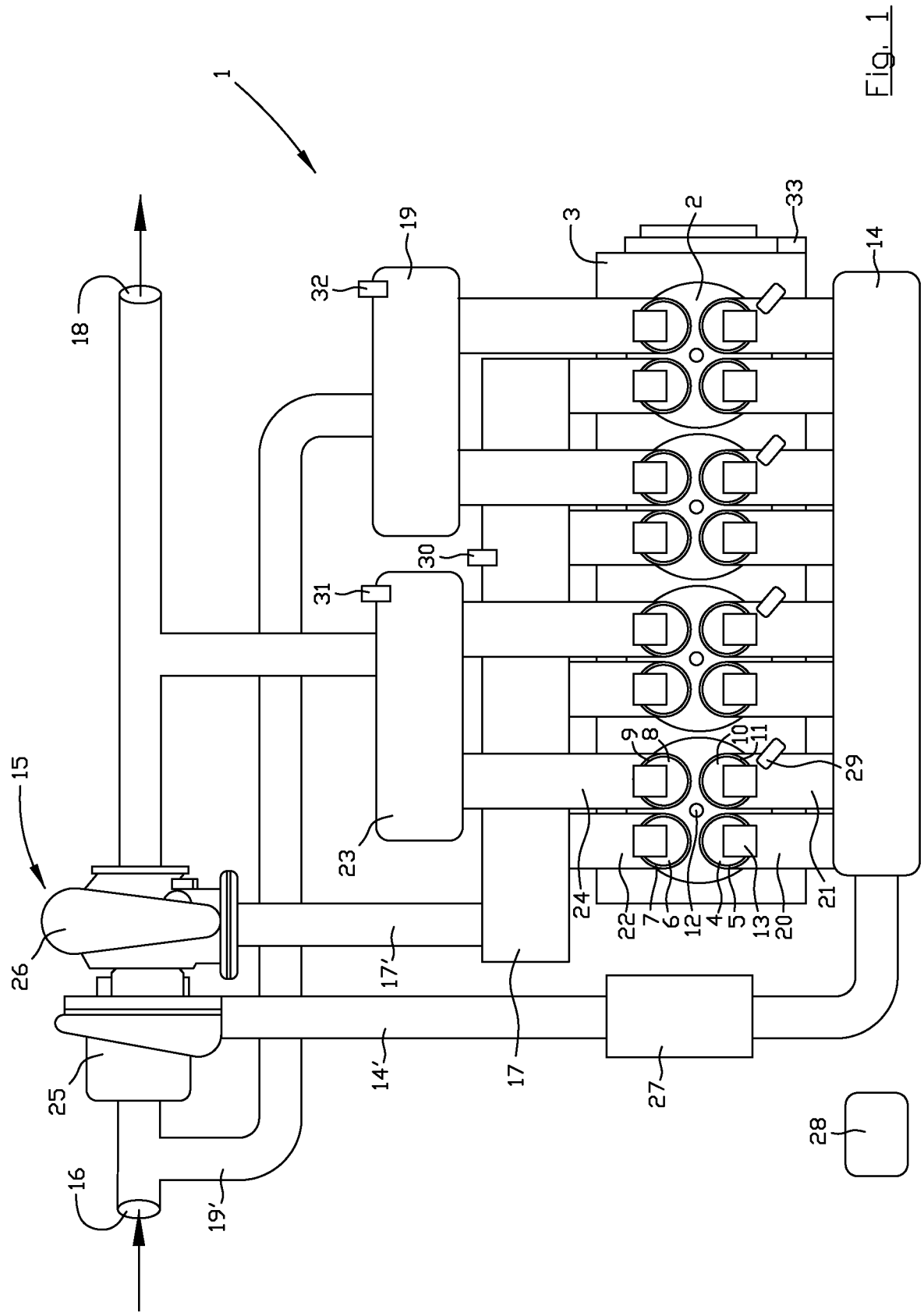
FIG. 1 is a schematic view from above of a first embodiment of an internal combustion engine according to the present invention.

Reference is now made to FIG. 1 disclosing a schematic view from above of a first embodiment of the inventive internal combustion engine 1, configured for exhaust gas recirculation.

The internal combustion engine 1 comprises an engine block 3 provided with four combustion chambers or cylinders 2. Each combustion chamber 2 is defined radially by a stationary cylinder wall, and is defined axially by a stationary cylinder head and a displaceable piston, respectively. The cylinder head may be releasably connected to the engine block 3 or may be integral with the engine block 3. The piston is configured to travel back and forth in the axial direction within the combustion chamber 2 and is connected to a revolving crankshaft via a piston rod, wherein the linear motion of the piston is converted into rotational motion of the crankshaft. Thus, the volume of the combustion chamber 2 changes cyclically as the piston moves up and down in the cylinder.

Each combustion chamber 2 is provided with a first controllable intake valve 4 configured for opening and closing a first intake port 5, a first controllable exhaust valve 6 configured for opening and closing a first exhaust port 7, and a second controllable exhaust valve 8 configured for opening and closing a second exhaust port 9. According to the disclosed embodiment, each combustion chamber 2 is further provided with a second controllable intake valve 10 configured for opening and closing a second intake port 11. Thereto, the combustion chamber 2 is provided with a spark plug 12. It shall be realized that the intake ports, exhaust ports and the spark plug are arranged in the cylinder head.

The first intake valve 4, the second intake valve 10, the first exhaust valve 6 and the second exhaust valve 8 are preferably of poppet valve type each having a valve stem and a valve disk attached to the lower end of the valve stem. In the closed position the valve disk abuts the material surrounding the corresponding port to prevent passage of gas through the port, whereas in the open position the valve disc is displaced vertically down into the combustion chamber 2 in order to uncover the port and allow gas to pass through the port and around the edge of the valve disk.

Each of the first intake valve 4, the second intake valve 10, the first exhaust valve 6 and the second exhaust valve 8, is preferably operated by means of a corresponding valve actuator 13. Thus, in the context of the present invention a valve actuator 13 allows the corresponding valve to be freely operated without the operation of the valve being slaved to the operation of the internal combustion engine 1, in particular the angular position of the crankshaft of the internal combustion engine, via a camshaft. A freely controllable valve actuator 13 is for example described in the patent literature documents US2015184558, SE1350849 and SE537203. Thus, the inventive internal combustion engine 1 comprises no camshaft, and is thus camshaft-free.

The internal combustion engine 1 comprises an intake manifold 14 and a main pressure booster 15 arranged upstream said intake manifold 14 for providing gas to the intake manifold 14 from an air inlet 16. The gas provided to the intake manifold 14 has elevated pressure. The internal combustion engine 1 comprises an exhaust discharge arrangement for evacuating exhaust gas from the internal combustion engine 1 to an exhaust outlet 18, the exhaust discharge arrangement comprises at least a main exhaust manifold 17. The internal combustion engine 1 comprises further an exhaust recirculation manifold 19. Usually at least one muffler and/or at least one catalytic converter are arranged adjacent the exhaust outlet 18, for decreasing the noise of operating of the internal combustion engine and/or for treating the exhaust gas, before the exhaust gas is eventually led off to the atmosphere.

Air/gas for combustion is supplied to the combustion chamber 2 from the intake manifold 14, and the intake manifold 14 is connected to the first intake port 5 of each combustion chamber 2 of said set of combustion chambers. Each combustion chamber 2 is provided with a first intake pipe/runner 20 connecting said intake manifold 14 and said first intake port 5. According to the disclosed embodiment the intake manifold 14 is also connected to the second intake port 11 of each combustion chamber 2, via a second intake pipe/runner 21.

The main exhaust manifold 17 of the exhaust discharge arrangement is connected to the first exhaust port 7 of each combustion chamber 2 of said set of combustion chambers, and thereto the second exhaust port 9 of each combustion chamber 2 of a first subset combustion chambers is also connected to the exhaust discharge arrangement. In the disclosed embodiment, said first subset combustion chambers is constituted by the two left combustion chambers 2. According to the disclosed embodiment the exhaust discharge arrangement comprises a supplementary exhaust manifold 23 connected to the second exhaust port 9 of each combustion chamber 2 of the first subset combustion chambers. The supplementary exhaust manifold 23 represents a bypass exhaust component in the disclosed embodiment.

Each combustion chamber 2 is provided with a first exhaust pipe/runner 22 connecting said main exhaust manifold 17 and said first exhaust port 7. Thereto, each combustion chamber 2 is provided with a second exhaust pipe/runner 24, extending from the second exhaust port 9.

The exhaust recirculation manifold 19 is connected to the second exhaust port 9 of each combustion chamber 2 of a second subset combustion chambers. In the disclosed embodiment, said second subset combustion chambers is constituted by the two right combustion chambers 2. The exhaust recirculation manifold 19 is connected to an upstream side of the main pressure booster 15 in relation to the intake manifold 14, in order to be able to recirculate the exhaust gas generated in the combustion chambers 2 of the second subset combustion chambers to the upstream side of the intake manifold 14 where the exhaust gas is mixed with fresh air. The exhaust recirculation manifold 19 is connected to the upstream side of the main pressure booster 15 via an exhaust recirculation pipe 19'.

Preferably the number of combustion chambers 2 of the first subset combustion chambers is equal to or more than the number of combustion chambers 2 of the second subset combustion chamber. It shall be pointed out that the sum if the first subset combustion chambers and the second subset combustion chambers is equal to the number of combustion chambers of said set of combustion chambers.

The main pressure booster 15 is preferably constituted by a turbocharger, i.e. a pressure booster driven by exhaust gas. The main turbocharger 15 comprises a compressor 25 which is powered by a turbine 26 driven by the exhaust gas from the main exhaust manifold 17. The compressor 25 is connected to the intake manifold 14 via an intake pipe 14', and the main exhaust manifold 17 is connected to the turbine 26 via a main exhaust pipe 17'. According to the disclosed embodiment, the supplementary exhaust manifold 23 is connected to the exhaust outlet 18 bypassing the turbine 26 of the main turbocharger 15.

An intercooler and/or a supercharger 27 may be arranged between the main pressure booster 15 and the intake manifold 14. A supercharger, in contrast to a turbocharger, is mechanically or electrically driven. Thereto, an intercooler may be arranged at the exhaust recirculation pipe 19'. Said intercoolers will decrease the temperature of the gas provided to the intake manifold 14 resulting in a better filling of the combustion chambers 2.

The internal combustion engine 1 further comprises an electronic control unit (ECU) 28, wherein the ECU 28 is configured to at least control the opening and closing of the first intake valve 4, the second intake valve 10, the first exhaust valve 6 and the second exhaust valve 8, using the corresponding actuators 13. In the disclosed embodiment, a fuel injector 29 is provided in the second intake runner/pipe 21 for injecting fuel into the air flowing past the fuel injector 29 into the combustion chamber 2 through the second intake port 11. In an alternative embodiment the inventive internal combustion engine is provided with direct injection of the fuel into the combustion chambers 2.

The internal combustion engine 1 may also comprise a main exhaust manifold sensor 30, a supplementary exhaust manifold sensor 31 and an exhaust recirculation manifold sensor 32, for determining at least one status of the exhaust gas in the corresponding manifolds, for instance pressure or temperature. The internal combustion engine 1 comprises an RPM sensor 33 for determining the speed of the internal combustion engine 1.

As is known to a person skilled in the art a four stroke internal combustion engine conventionally proceeds through four strokes, namely (1) Intake—this stroke beginning with the piston at it's highest position, i.e. closest to the cylinder head, and comprising moving the piston down while air is introduced into the combustion chamber 2 through the intake ports 5 and 11 and fuel is also introduced into the combustion chamber 2 using the fuel injector 29, (2) Compression—this stroke comprising closing the intake valves 4 and 10 before moving the piston up towards the cylinder head while compressing the air-fuel mixture, (3) Power—igniting the air-fuel mixture wherein the resulting pressure caused by the combustion of the fuel will displace the piston downwards and away from the cylinder head, and (4) Exhaust—opening the exhaust valves 6 and 8 for allowing the exhaust gas formed by the combustion of the air-fuel mixture to evacuate from the combustion chamber 2 while the piston once more returns to its highest position.

The inventive internal combustion engine 1 is configured to be driven in at least a high load mode (HL) and in a low load mode (LL), respectively. The maximum output torque [Nm] of the internal combustion engine 1 is dependent on engine speed [rpm], and the output torque of the internal combustion engine is in this context equivalent with driver/operator requested output torque via an accelerator pedal. During high load mode (HL) the driver/operator requests elevated output torque via the accelerator pedal, and during low load mode (LL) the driver/operator request moderate output torque.

The ECU 28 is configured to adjust the filling rate of the combustion chambers 2 and fuel in view of the engine speed and the requested output torque, i.e. the amount of air/gas going into a combustion chamber 2 in relation to the volume of the combustion chamber.

According to the invention, during the low load mode (LL), the internal combustion engine 1 is configured to evacuate at least 90% of the exhaust gas of the second subset combustion chambers to the exhaust recirculation manifold 19 and is configured to evacuate the exhaust gas of the first subset combustion chambers to the exhaust discharge arrangement. Preferably, the internal combustion engine 1 is configured to evacuate at least 95%, most preferably 100%, of the exhaust gas of the second subset combustion chambers to the exhaust recirculation manifold 19. Preferably, the most of the exhaust gas of the first subset combustion chambers is evacuated to the main exhaust manifold 17.

According to the invention, during the high load mode (HL), the internal combustion engine 1 is configured to evacuate at least 90% of the exhaust gas of the second subset combustion chambers to the exhaust discharge arrangement and configured to evacuate the exhaust gas of the first subset combustion chambers to the exhaust discharge arrangement. Preferably, the internal combustion engine 1 is configured to evacuate at least 95% of the exhaust gas of the second subset combustion chambers to the exhaust discharge arrangement. According to the disclosed embodiment the at least 90% of the exhaust gas of the second subset combustion chambers is evacuated to the main exhaust manifold 17, and preferably the most of the exhaust gas of the first subset combustion chambers is evacuated to the main exhaust manifold 17.

In the inventive internal combustion engine 1, the ECU 28 is configured to selectively, and for each combustion chamber 2, open the first exhaust valve 6, the second exhaust valve 8, or both exhaust valves, for providing a large number of different combinations resulting in a large variety in the amount of exhaust gas that is recirculated to the intake manifold 14. Thus, in contrast to the prior art internal combustion engines locked to a fixed ratio of fresh air and exhaust gas, the inventive internal combustion engine 1 may go from 0% exhaust gas recirculation to at least 75% exhaust gas recirculation as determined by the selective opening and closing of the exhaust valves. The exhaust gas is rich in hydrogen gas, H2(g), and the provision of the exhaust gas to the air supplied to the combustion chambers 2 result in a cooler combustion and a higher thermal efficiency.

Thus depending on the engine speed, as determined by the RPM sensor 33, and the at least one status of the exhaust gas in the exhaust manifolds, said status for example being any one or more of the temperature, the oxygen content, and the pressure, of the exhaust gas, the ECU 28 is configured to obtain a suitable amount of exhaust gas recirculation, by varying the filling rate of the different combustion chambers so that the air going into the intake manifold 14 may contain for example 5%, 10%, 20%, 25%, 30%, 35%, 40%, 45%, 50%, etc., exhaust gas as required at each engine speed and load etc.

The ECU 28 may further be configured for varying the amount of fuel injected into each combustion chamber to provide a suitable relationship, or lambda value, between air and fuel to provide an exhaust gas suitable for recirculation.

During low load mode (LL) the ECU 28 can control the freely controllable actuators 13 for opening the first intake valve 4 and the second intake valve 10, of the second subset combustion chambers, for a short period during the intake stroke of the internal combustion engine 1 to thereby decrease the amount of the air-fuel mixture, thereby reducing the filling rate of the second subset combustion chambers operated to provide exhaust gas for recirculation. This results in that the second subset combustion chambers now produce less exhaust gas which subsequently results in less exhaust gas being recirculated to the intake manifold 14 and a higher ratio of fresh air in the intake manifold 14.

Alternatively, during low load mode (LL) the ECU 28 can control the freely controllable actuators 13 for opening the first intake valve 4 and the second intake valve 10, of the second subset combustion chambers, for a longer period during the intake stroke of the internal combustion engine 1 to thereby increase the amount of the air-fuel mixture, thereby increasing the filling rate of the second subset combustion chambers operated to provide exhaust gas for recirculation. This results in that the second subset combustion chambers now produce more exhaust gas which subsequently results in more exhaust gas being recirculated to the intake manifold 14 and a lower ratio of fresh air in the intake manifold 14.

The highest filling rate possible depends on the pressure of the air-fuel mixture going into the combustion chamber, thus at atmospheric pressure of the air-fuel mixture the maximum filling rate is limited to 100% of the volume of the combustion chamber. An internal combustion engine 1 comprising a pressure booster delivering air to the intake manifold at superatmospheric pressure, the filling rate may be above 100%.

The internal combustion engine 1 shown in FIG. 1 provides a good balance between performance and thermal efficiency. As only a second subset combustion chambers are fluidly connected to the exhaust recirculation manifold 19 the variability of the amount of exhaust gas that is recirculated is not 100%, but the provision of the main pressure booster 15 still increases the power output.

The internal combustion engine 1, during the high load mode (HL), is preferably configured to evacuate at least 1%, more preferably at least 2%, of the exhaust gas of the second subset combustion chambers to the exhaust recirculation manifold 19 when the output torque is greater than 70%, more preferably 75%, of said maximum output torque. The second exhaust valves 8 of the second subset combustion chambers are opened at the end of the evacuation stroke in order to evacuate any remaining exhaust gas, and in addition to keeping the second exhaust valves 8 of the second subset combustion chambers open during the end of the evacuation stroke, the ECU 28 may further be configured to flush exhaust gas from the second subset combustion chamber by opening the first intake valve 4 simultaneously as the second exhaust valve 8, and for a short time flush out any remaining exhaust gas through the second exhaust port 9.

The use of one first intake port 5 and one second intake port 11, and with the fuel injector 29 being provided as a port injector only in the second intake runner 21, is also advantageous as it allows exhaust gas in the combustion chamber 2 to be flushed out through the second exhaust port 9 using only air from the first intake port 5. Thus, by opening only the first intake valve 4 during the flushing out of exhaust gas there is no loss of fuel from fuel injector 29.

The internal combustion engine 1 is configured to shift from low load mode (LL) to high load mode (HL) at a predetermined first torque level (T1) and configured to shift from high load mode (HL) to low load mode (LL) at a predetermined second torque level (T2). Preferably, the first torque level (T1) is greater than the second torque level (T2), and preferably the first torque level (T1) is 50% of said maximum output torque, and preferably the second torque level (T2) is 45% of the said maximum output torque. The internal combustion engine 1 is configured to shift from the low load mode (LL) to the high load mode (HL) when the filling rate of all combustion chambers is maximal and the internal combustion engine 1 is providing maximum performance in the low load mode (LL).

It shall be pointed out that the internal combustion engine 1 may be temporarily placed in Economy Mode, wherein the internal combustion engine 1 is prevented to shift to the high load mode (HL) or the first torque level (T1) is increased. The increased first torque level (T1) in the Economy Mode is for instance 80% of the maximum output torque. The second torque level (T2) may also be increased in the Economy Mode, for instance to 70% of the maximum output torque.

It shall also be pointed out that the internal combustion engine 1 may be temporarily placed in Sport Mode, wherein the internal combustion engine 1 is prevented to shift to the low load mode (LL) or the first torque level (T1) and the second torque level (T2) are decreased. The decreased first torque level (T1) in the Sport Mode is for instance 20% of the maximum output torque, and the decreased second torque level (T2) in the Sport Mode is for instance 15% of the maximum output torque.

A rich air-fuel mixture prevents knocking. In the internal combustion engine 1 the second subset combustion chambers connected to the exhaust recirculation manifold 19 are preferably run with a rich air-fuel mixture, i.e. with more fuel than needed for the air that is introduced. During the low load mode (LL) the internal combustion engine 1 is controlled such that an average lambda value of the second subset combustion chambers is equal to or more than 0.6 and equal to or less than 0.9. Preferably equal to or more than 0.7 and equal to and less than 0.8. During the high load mode (HL) the internal combustion engine 1 is controlled such that an average lambda value of the second subset combustion chambers is equal to or more than 0.8 and equal to or less than 1. Preferably equal to or more than 0.85 and equal to and less than 0.95.

In the internal combustion engine 1 the first subset combustion chambers connected to the exhaust discharge arrangement are run with a optimal air-fuel mixture, i.e. during the low load mode (LL) the internal combustion engine 1 is controlled such that an average lambda value of the first subset combustion chambers is equal to or more than 0.95 and equal to or less than 1.05. Preferably equal to or more than 0.97 and equal to and less than 1.03. During the high load mode (HL) the internal combustion engine 1 is controlled such that an average lambda value of the first subset combustion chambers is equal to or more than 0.8 and equal to or less than 1, preferably equal to or more than 0.85 and equal to and less than 0.95.

It shall be pointed out that the lambda values may be measured and/or calculated.

In the disclosed embodiment according to FIG. 1, the second exhaust ports 9 of the first subset combustion chambers are connected to the supplementary exhaust manifold 23 of the exhaust discharge arrangement, and the supplementary exhaust manifold 23 is bypassing the main turbocharger 15. The ECU 28 may therefore be configured to reduce the risk of knocking by being configured to open the second exhaust valves 8 of the first subset combustion chambers if the pressure in the main exhaust manifold 17 and the main turbocharger 15 is higher than the pressure of the intake manifold 14, i.e. supplied by the main turbocharger 15. This ensures that the air entering the combustion chambers 2 from the intake manifold 14 has a higher pressure than the exhaust gas leaving the combustion chamber 2, since opening of the second exhaust valve 8 of the first subset combustion chambers allows exhaust gas to leave the combustion chamber 2 to the atmosphere via the supplementary exhaust manifold 23. Thus, in a situation where the pressure of the air from the main turbocharger 15 has a pressure of for example 1 barg, i.e. 1 bar above atmospheric pressure, and the pressure of exhaust gas in the first exhaust ports 7 is for example 1.5 barg, the ECU 28 will open the second exhaust valve 8 of the first subset combustion chambers during the initial part of the intake stroke to allow the air to flush out or displace the exhaust gas from the combustion chamber 2 through the second exhaust port 8 which is fluidly connected to the atmosphere having a pressure of 0 barg via the supplementary exhaust manifold 23. By ensuring that all exhaust gas is removed from the combustion chamber the temperature in the combustion chamber is lowered and the exhaust gas cannot heat the new charge of air and fuel delivered into the combustion chamber 2 during the intake stroke.

Figure 2:
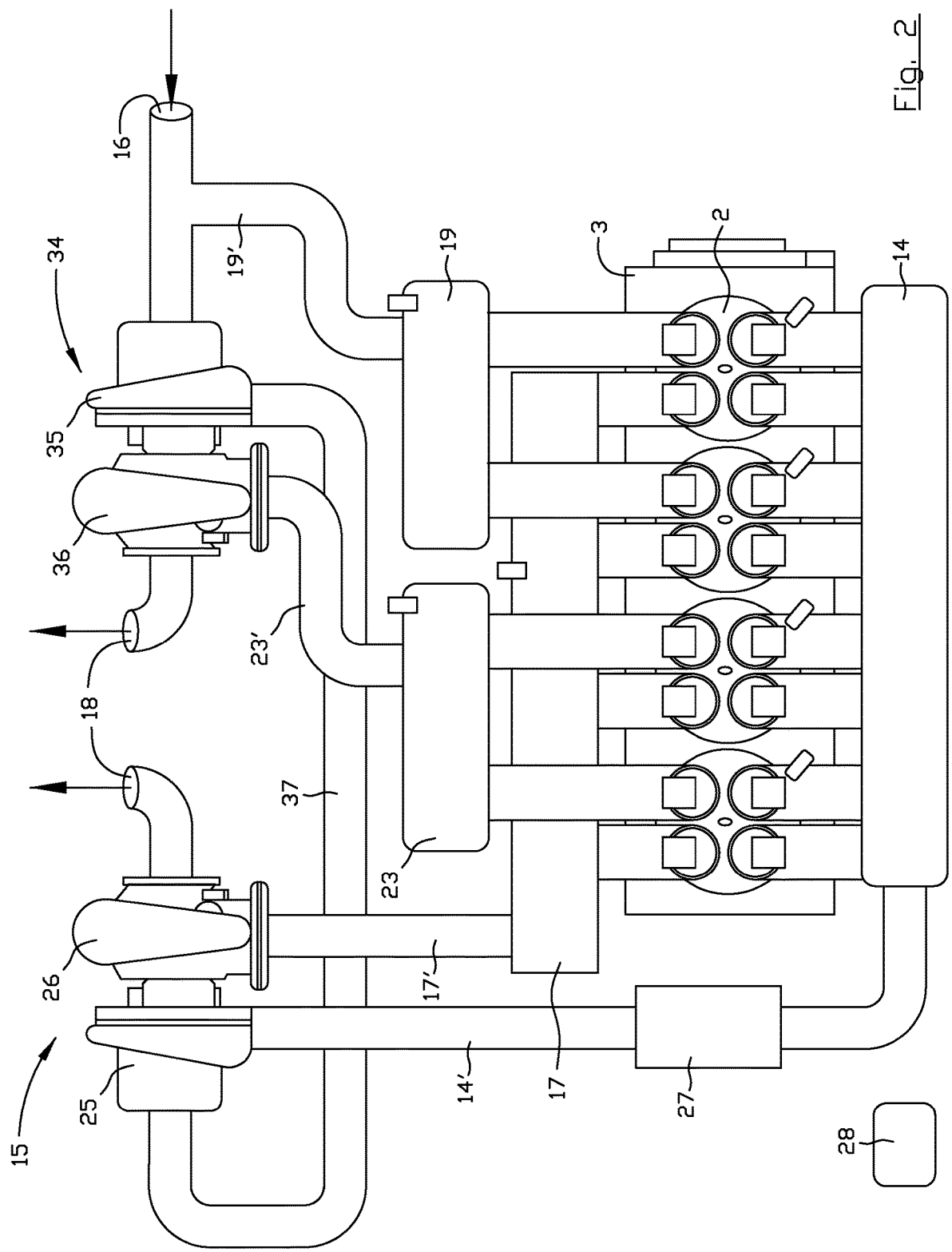
FIG. 2 is a schematic view from above of a second embodiment of an internal combustion engine according to the present invention.

Reference is now made to FIG. 2 disclosing a second embodiment of an internal combustion engine 1 according to the present invention. Features and relationships alike the first embodiment is not described.

The internal combustion engine according to FIG. 2 differs from the internal combustion engine according to FIG. 1 especially in that the supplementary exhaust manifold 23 is connected to a supplementary pressure booster 34 via a supplementary exhaust pipe 23'. The supplementary pressure booster 34 is connected to an upstream side of the main pressure booster 15 in relation to the intake manifold 14, and the supplementary exhaust manifold 23 is connected to an upstream side of the supplementary pressure booster 34 in relation to the main pressure booster 15.

The supplementary pressure booster 34 is preferably constituted by a turbocharger, i.e. a pressure booster driven by exhaust gas. The supplementary turbocharger 34 comprises a compressor 35 which is powered by a turbine 36 driven by the exhaust gas from the supplementary exhaust manifold 23. The compressor 35 of the supplementary turbocharger 34 is connected to the compressor 25 of the main turbocharger 15 via an intermediate compressor pipe 37, and the exhaust recirculation manifold 19 is connected to the upstream side of the turbine 36 of the supplementary turbocharger 34 via the exhaust recirculation pipe 19', to be mixed with the fresh air. The supplementary turbocharger 34 takes in air via the air inlet 16, and compresses the air to a low pressure, for example 1 barg as compared to 0 barg atmospheric pressure of the air at the air inlet 16. The air compressed in the supplementary turbocharger 34 is not supplied directly to the intake manifold 14, but is rather a modified air intake of the main turbocharger 15. The main turbocharger 15 then further compresses the air to a pressure of about 2-3 barg, which is then supplied to the intake manifold 14, preferably via an intercooler located at the intake pipe 14'.

The internal combustion engine disclosed in FIG. 2 has a number of advantages. At low engine speed, where the amount of exhaust gas produced per time unit is low, the exhaust gas of the first subset combustion chambers is directed to the main turbocharger 15 of the exhaust discharge arrangement. When the ECU 28 determines that the pressure of the air delivered into the first subset combustion chamber is lower than the pressure of the exhaust gas in the main exhaust manifold 17, the ECU 28 opens the second exhaust valve 8 of the first subset combustion chambers for leading off at least part of the exhaust gas to the supplementary turbocharger 34. As the supplementary turbocharger 34 is not continuously supplied with exhaust gas, or only supplied with a low amount of exhaust gas, the resistance to passage of exhaust gas through the exhaust turbine 35 to the atmosphere is low.

At high load mode (HL), as the main turbocharger 15 has entered an area of optimum efficiency, the ECU 28 deliver more and more exhaust gas to the supplementary turbocharger 34 through the second exhaust port 9 of the first subset combustion chambers. The increased amounts of exhaust gas delivered to the supplementary turbocharger 34 on one hand increases the resistance to flow of the exhaust gas through the supplementary turbocharger 34, however the supplementary turbocharger 34 now, with increasing speed of the exhaust turbine 35, provides air to the main turbocharger 15 with an increasing pressure. This allows the main turbocharger 15 to further increase the pressure of the air supplied to the intake manifold 14 which once more ensures that the pressure of the air delivered into the combustion chambers 2 is sufficiently high to flush out the exhaust gases.

The ECU 28 or similar computer readable medium having stored thereon a computer program product comprising instructions to cause the inventive internal combustion engine 1 to execute the steps of the inventive method.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall be pointed out that controlling the opening is also to be understood as controlling the closing. Controlling the opening is further to be understood as controlling any of the valve lift, the duration of opening, and when in the operation/cycle of the internal combustion engine the valve is opened.

The ECU may be configured for flushing out exhaust gas from the combustion chambers during both part of an intake stroke and part of an exhaust stroke.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even though it is not explicitly stated that features from a specific embodiment may be combined with features from another embodiment, the combination shall be considered obvious, if the combination is possible.

The invention claimed is:

1. An internal combustion engine (1) comprising a set of combustion chambers (2), each combustion chamber (2) being provided with:
    a first controllable intake valve (4) configured for opening and closing a first intake port (5),
    a first controllable exhaust valve (6) configured for opening and closing a first exhaust port (7), and
    a second controllable exhaust valve (8) configured for opening and closing a second exhaust port (9),
    the internal combustion engine (1) further comprising:
    an intake manifold (14) connected to the first intake port (5) of each combustion chamber of said set of combustion chambers (2),
    a main pressure booster (15) arranged upstream said intake manifold (14) for providing gas to the intake manifold (14),
    an exhaust discharge arrangement comprising a main exhaust manifold (17) connected to the first exhaust port (7) of each combustion chamber of said set of combustion chambers (2), the exhaust discharge arrangement being connected to the second exhaust port (9) of each combustion chamber of a first subset combustion chambers, and
    an exhaust recirculation manifold (19) connected to the second exhaust port (9) of each combustion chamber of a second subset combustion chambers and connected to an upstream side of the main pressure booster (15) in relation to said intake manifold (14),
    wherein the internal combustion engine (1) is configured to be driven in at least a high load mode (HL) and in a low load mode (LL), respectively, wherein
    i) during the low load mode (LL), the internal combustion engine (1) is configured to evacuate at least 90% of the exhaust gas of the second subset combustion chambers to the exhaust recirculation manifold (19) and configured to evacuate the exhaust gas of the first subset combustion chambers to the exhaust discharge arrangement, and
    ii) during the high load mode (HL), the internal combustion engine (1) is configured to evacuate at least 90% of the exhaust gas of the second subset combustion chambers to the exhaust discharge arrangement and configured to evacuate the exhaust gas of the first subset combustion chambers to the exhaust discharge arrangement,
    wherein the maximum output torque [Nm] of the internal combustion engine (1) is dependent on engine speed [rpm], and during the high load mode (HL), the internal combustion engine (1) is configured to evacuate at least 1% of the exhaust gas of the second subset combustion chambers to the exhaust recirculation manifold (19) when the output torque is greater than 70% of said maximum output torque.

2. The internal combustion engine according to claim 1, wherein the maximum output torque [Nm] of the internal combustion engine (1) is dependent on engine speed [rpm], wherein the internal combustion engine (1) is configured to shift from low load mode (LL) to high load mode (HL) at a predetermined first torque level (T1) and configured to shift from high load mode (HL) to low load mode (LL) at a predetermined second torque level (T2).

3. The internal combustion engine according to claim 1, wherein the number of combustion chambers of the first subset combustion chambers is equal to or more than the number of combustion chambers of the second subset combustion chamber.

4. The internal combustion engine according to claim 1, wherein the exhaust discharge arrangement comprises a supplementary exhaust manifold (23) connected to the second exhaust port (9) of each combustion chamber of the first subset combustion chambers.

5. The internal combustion engine according to claim 4, wherein the internal combustion engine comprises a supplementary pressure booster (34) connected to an upstream side of the main pressure booster (15) in relation to said intake manifold (14), and wherein the supplementary exhaust manifold (23) is connected to an upstream side of the supplementary pressure booster (34) in relation to the main pressure booster (15).

6. The internal combustion engine according to claim 5, wherein the supplementary pressure booster (34) is constituted by a turbocharger.

7. The internal combustion engine according to claim 1, wherein a supercharger (27) is arranged between the main pressure booster (15) and the intake manifold (14).

8. The internal combustion engine according to claim 1, wherein the main pressure booster (15) is constituted by a turbocharger.

9. A method for controlling an internal combustion engine (1) comprising a set of combustion chambers (2), each combustion chamber (2) being provided with:
- a first controllable intake valve (4) configured for opening and closing a first intake port (5),
- a first controllable exhaust valve (6) configured for opening and closing a first exhaust port (7), and
- a second controllable exhaust valve (8) configured for opening and closing a second exhaust port (9), the internal combustion engine (1) further comprising:
- an intake manifold (14) connected to the first intake port (5) of each combustion chamber of said set of combustion chambers (2),
- a main pressure booster (15) arranged upstream said intake manifold (14) for providing gas to the intake manifold (14),
- an exhaust discharge arrangement comprising a main exhaust manifold (17) connected to the first exhaust port (7) of each combustion chamber of said set of combustion chambers (2), the exhaust discharge arrangement being connected to the second exhaust port (9) of each combustion chamber of a first subset combustion chambers, and
- an exhaust recirculation manifold (19) connected to the second exhaust port (9) of each combustion chamber of a second subset combustion chambers and connected to an upstream side of the main pressure booster (15) in relation to said intake manifold (14), the method comprising:
operating the internal combustion engine (1) alternately in at least a high load mode (HL) and in a low load mode (LL), respectively, wherein i) during the low load mode (LL), the internal combustion engine (1) evacuates at least 90% of the exhaust gas of the second subset combustion chambers to the exhaust recirculation manifold (19) and evacuates the exhaust gas of the first subset combustion chambers to the exhaust discharge arrangement, and ii) during the high load mode (HL), the internal combustion engine ( ) evacuates at least 90% of the exhaust gas of the second subset combustion chambers to the exhaust discharge arrangement and evacuates the exhaust gas of the first subset combustion chambers to the exhaust discharge arrangement, wherein the maximum output torque [Nm] of the internal combustion engine (1) is dependent on engine speed [rpm], and during the high load mode (HL), the internal combustion engine (1) evacuates at least 1% of the exhaust gas of the second subset combustion chambers to the exhaust recirculation manifold (19) when the output torque is greater than 70% of the maximum output torque.

10. The method according to claim 9, wherein the maximum output torque [Nm] of the internal combustion engine (1) is dependent on engine speed [rpm], wherein the internal combustion engine (1) shift from low load mode (LL) to high load mode (HL) at a predetermined first torque level (T1) and shift from high load mode (HL) to low load mode (LL) at a predetermined second torque level (T2).

11. The method according to claim 10, wherein the first torque level (T1) is greater than the second torque level (T2).

12. The method according to claim 10, wherein the first torque level (T1) is 50% of said maximum output torque.

13. The method according to claim 10, wherein the second torque level (T2) is 45% of the said maximum output torque.

14. The method according to claim 9, wherein the internal combustion engine (1) during the low load mode (LL) is controlled such that an average lambda value of the second subset combustion chambers is equal to or more than 0.6 and equal to or less than 0.9.

15. The method according to claim 9, wherein the internal combustion engine (1) during the high load mode (HL) is controlled such that an average lambda value of the second subset combustion chambers is equal to or more than 0.8 and equal to or less than 1.

16. The method according to claim 9, wherein the internal combustion engine (1) during the low load mode (LL) is controlled such that an average lambda value of the first subset combustion chambers is equal to or more than 0.95 and equal to or less than 1.05.

17. The method according to claim 9, wherein the internal combustion engine (1) during the high load mode (HL) is controlled such that an average lambda value of the first subset combustion chambers is equal to or more than 0.8 and equal to or less than 1.

18. A non-transitory computer-readable medium on which is stored a computer program comprising instructions that, when executed by a computer, causes the internal combustion engine according to claim 1 to perform a method comprising:

operating the internal combustion engine (1) alternately in at least a high load mode (HL) and in a low load mode (LL), respectively, wherein i) during the low load mode (LL), the internal combustion engine (1) evacuates at least 90% of the exhaust gas of the second subset combustion chambers to the exhaust recirculation manifold (19) and evacuates the exhaust gas of the first subset combustion chambers to the exhaust discharge arrangement, and ii) during the high load mode (HL), the internal combustion engine ( ) evacuates at least 90% of the exhaust gas of the second subset combustion chambers to the exhaust discharge arrangement and evacuates the exhaust gas of the first subset combustion chambers to the exhaust discharge arrangement, wherein the maximum output torque [Nm] of the internal combustion engine (1) is dependent on engine speed [rpm], and during the high load mode (HL), the internal combustion engine (1) evacuates at least 1% of the exhaust gas of the second subset combustion chambers to the exhaust recirculation manifold (19) when the output torque is greater than 70% of the maximum output torque.

19. The internal combustion engine according to claim 2, wherein the number of combustion chambers of the first subset combustion chambers is equal to or more than the number of combustion chambers of the second subset combustion chamber.

20. The internal combustion engine according to claim 2, wherein the exhaust discharge arrangement comprises a supplementary exhaust manifold (23) connected to the second exhaust port (9) of each combustion chamber of the first subset combustion chambers.

* * * * *